(12) United States Patent
Gutierrez (10) Patent No.: US 7,747,155 B1
(45) Date of Patent: Jun. 29, 2010

(54) ZOOM LENS ASSEMBLY

(75) Inventor: Roman C. Gutierrez, Arcadia, CA (US)

(73) Assignee: Siimpel Corporation, Arcadia, CA (US)

( * ) Notice: Subject to any disclaimer, the term of this patent is extended or adjusted under 35 U.S.C. 154(b) by 0 days.

(21) Appl. No.: 12/353,728

(22) Filed: Jan. 14, 2009

Related U.S. Application Data (62) Division of application No. 11/263,152, filed on Oct. 31, 2005, now Pat. No. 7,495,852.

(60) Provisional application No. 60/657,261, filed on Feb. 28, 2005.

(51) Int. Cl.
*G03B 17/00* (2006.01)
*G03B 9/08* (2006.01)

(52) U.S. Cl. .......................... 396/73; 396/452

(58) Field of Classification Search .................. 396/73, 396/74, 452
See application file for complete search history.

(56) References Cited

U.S. PATENT DOCUMENTS

| | | | | |
|---|---|---|---|---|
| 3,573,367 A * | 4/1971 | LaRue, Jr. .................... 348/357 |
| 4,027,968 A * | 6/1977 | Spence-Bate ................ 355/46 |
| 4,573,780 A * | 3/1986 | Sato et al. ..................... 396/75 |
| 4,946,265 A | 8/1990 | Shimizu et al. |
| 5,079,576 A * | 1/1992 | Kodaira ........................ 396/544 |
| 5,128,808 A | 7/1992 | Dosaka |
| 6,226,460 B1 * | 5/2001 | Hino et al. .................... 396/73 |
| 6,643,457 B2 * | 11/2003 | Chen ............................ 396/74 |
| 7,209,294 B2 | 4/2007 | Takahashi |
| 2005/0068444 A1 * | 3/2005 | Oshima et al. .............. 348/335 |
| 2005/0094284 A1 * | 5/2005 | Takahashi .................... 359/647 |

* cited by examiner

*Primary Examiner*—Rodney E Fuller
(74) *Attorney, Agent, or Firm*—Haynes and Boone, LLP (57) ABSTRACT

A zoom lens assembly for a miniature camera, such as those used in cellular telephones and other personal electronic devices, is disclosed. One or more lenses of the zoom lens assembly are moved in and/or out of the optical path of the zoom lens assembly to change the magnification of the lens. Since the magnification does not necessarily require movement of lenses along the optical path of the camera, the length of the zoom lens assembly, and consequently of the camera as well, is substantially reduced.

5 Claims, 5 Drawing Sheets

ZOOM LENS ASSEMBLY

PRIORITY CLAIM

This patent application is a divisional patent application of U.S. patent application Ser. No. 11/263,152, filed on Oct. 31, 2005 now U.S. Pat. No. 7,495,852 which claims the benefit of U.S. provisional patent application Ser. No. 60/657,261, filed on Feb. 28, 2005 and entitled AUTOFOCUS CAMERA pursuant to 35 USC 119. The entire contents of this provisional patent application are hereby expressly incorporated by reference.

TECHNICAL FIELD

The present invention relates generally to optics. The present invention relates more particularly to a zoom lens assembly having a reduced length such that it is suitable for use in miniature cameras.

BACKGROUND

Miniature cameras are well known. Miniature cameras are widely used in contemporary cellular telephones. They are also used in other devices, such as laptop computers and personal digital assistants (PDAs). Miniature cameras can even be used as stand alone devices for such applications as security and surveillance.

Contemporary miniature cameras, such as those used in cellular telephones, do not typically have zoom lenses. Zoom lenses necessitate the use of one or more additional lens elements that inherently increase the length of the camera (at least according to contemporary practice). As those skilled in the art will appreciate, miniature cameras for cellular telephones and the like are subject to strict size constraints. These size constrains limit the overall length of the camera and thus either prohibit the use of zoom lenses or substantially mitigate the effectiveness thereof by limiting the number of lens elements and/or the range of motion thereof.

However, zoom lenses are desirable. Zoom lenses provide magnification that enhances the detail of images, such as those taken from a distance. As such, it is desirable to have a zoom lens in the camera of a cellular telephone or the like. Moreover, it is desirable to provide a zoom lens that is short enough in length to be used in miniature cameras, such as those cameras that are used in cellular telephones and the like.

BRIEF SUMMARY

Systems and methods are disclosed herein to provide for the zooming of a miniature camera. More particularly, a zoom lens assembly for miniature cameras, such as those used in cellular telephones and other personal electronic devices, is disclosed. One or more lenses of the zoom lens assembly can be moved in and/or out of the optical path of the zoom lens assembly to change the magnification of the lens. For example, a plurality of lenses can be configured to move in and out of the optical path.

Lens parameters other than magnification can similarly be changed, either while at the same time changing magnification or while leaving magnification unchanged. For example, various aberrations can be corrected by adding and/or removing one or more lenses, wherein such removing or adding of lens can optionally also change magnification.

Embodiments of the present invention can effectively simulate the movement of a lens, exchange one lens for another, and simulate the movement of a lens while exchanging it for another lens. Movement can be simulated so as to change the optical properties of a system, such as to vary magnification or zoom.

One lens can be exchanged for another so as to vary the optical properties of the lens (and consequently of the optical system, as well). For example, a lens can be exchanged with another that has different aberration corrections qualities.

Optical elements other than lenses can be placed into and removed from the optical path. Thus, both refractive and diffractive elements can be selectively placed into and removed from the optical path. Indeed, other optical elements such as spectral filters and polarization filters can similarly be added to or removed from the optical path.

More particularly, a plurality of lenses wherein each lens has approximately the same power can be configured to move in and out of the optical path. Alternatively, a plurality of lenses wherein each lens has a different power can be configured to move in and out of the optical path.

Optionally, at least one lens can configured to move along (rather than in and out of) the optical path of the zoom lens assembly. For example, at least one of the lenses that is configured to move in and out of the optical path can also be configured to move along the optical path. As a further example, all of the lenses that are configured to move in and out of the optical path can also be configured to move along the optical path.

All of the lenses that are configured to move in and out of the optical path can also be configured to move along the optical path in unison with respect to one another. Alternatively, movement of the lenses along the optical path can be individually controllable. Thus, the lenses do not have to move along the optical path in unison with respect to one another.

Rather than configuring one or more of the lenses that move in and out of the optical path such that they can also move along the optical path, one or more other lenses (that is, lenses that are not configured to move in and out of the optical path), can be configured to move along the optical path. In any case, lenses that are configured to move along the optical path of the zoom lens assembly can be made to do so in order to provide fine adjustment of the magnification or other optical parameter provided by the zoom lens assembly.

Optionally, the lens(es) can be configured to move in and out of the optical path of the zoom lens assembly at a rate that is faster than a frame rate of the camera. For example, the lens(es) can be configured to move in and out of the optical path of the zoom lens assembly at a rate that is faster than 30 times per second. In this manner, a lens can be moved into or out of the optical path of the zoom lens assembly between frames, such that the movement of the lens does not adversely affect imaging.

According to another aspect, the present invention comprises a shutter blade for a camera, wherein the shutter blade comprises a light blocking portion that is configured to block light from entering the camera and at least one lens that is configured to magnify an image of the camera. The shutter can contain a plurality of lenses that are configured to magnify an image of the camera, such that a corresponding plurality of different magnifications can be provided for the image.

Since varying the magnification does not necessarily require movement of lenses along the optical path of the camera (as is required in contemporary zoom lens assemblies), the length of the zoom lens assembly, and consequently the length of the camera as well, can be substantially reduced. As such, a camera having smaller overall dimensions can be made. Such a camera is suitable for use in cellular telephones and other personal electronic devices.

This invention will be more fully understood in conjunction with the following detailed description taken together with the following drawings.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION OF THE INVENTION

A method and system for providing zoom for a miniature camera are disclosed. According to this method, one or more lenses can be moved into and out of the optical path of a zoom lens assembly. This can be done either instead of moving the lenses along the optical path of the zoom lens assembly or in addition thereto. In either instanced, the need to move lenses along the optical path of the camera is mitigated, consequently facilitating a reduction in the length of the optical path and thus a corresponding reduction in the length of the camera.

Movement along the optical path can be defined herein as movement toward or away from an imager (at least for collinear optical systems such as those shown in FIGS. 1, 2, 5, and 6). Movement into and out of the optical path can be movement that is generally perpendicular to the optical path.

Figure 1:
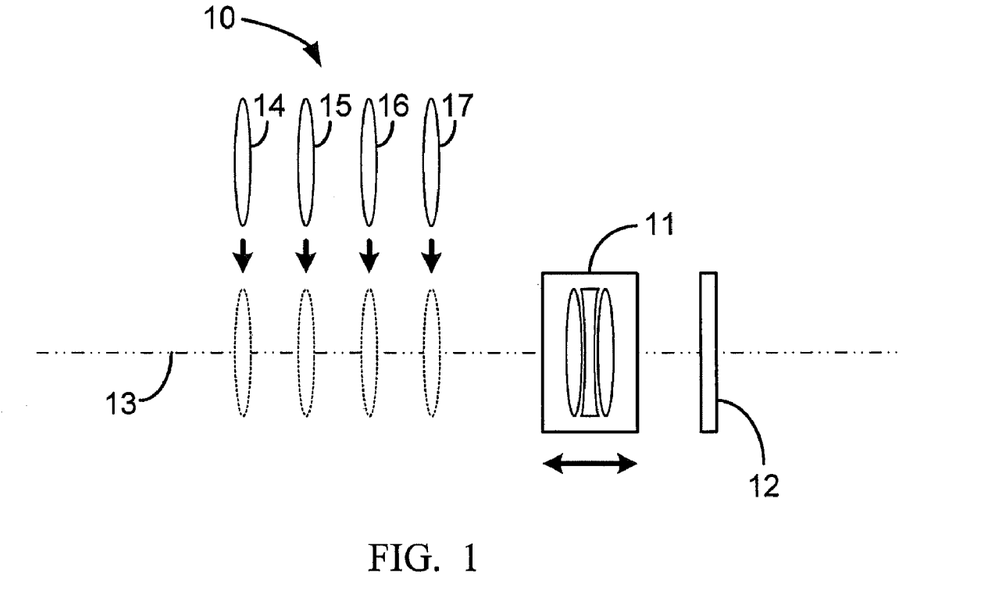
FIG. 1 is a semi-schematic side view of a camera having a zoom lens assembly according to an exemplary embodiment of the present invention, wherein all of the lenses thereof are configured to move in and out of the optical path of the zoom lens assembly and all of the lenses are shown positioned out of the optical path.

Referring now to FIG. 1, according to one embodiment of the present invention, a camera is defined by a zoom lens assembly 10, a focusing lens assembly 11, and an imaging sensor 12. Lenses 14-17 of zoom lens assembly 10 can be moved in and out of an optical path 13 of the camera so as to change a magnification and/or other aspect of an image formed upon imaging sensor 12, as discussed in detail below. Focusing lens assembly 11 can be moved along optical path 13 so as to effect focusing, according to well known principles.

Any desired ones of lens 14-17 can be moved from the positions shown in FIG. 1 (which are out of optical path 13) to positions that are in optical path 13. Thus, any desired combination of lenses 14-17 can define the magnification and/or other optical quality of the image formed upon imaging sensor 12.

Figure 2:
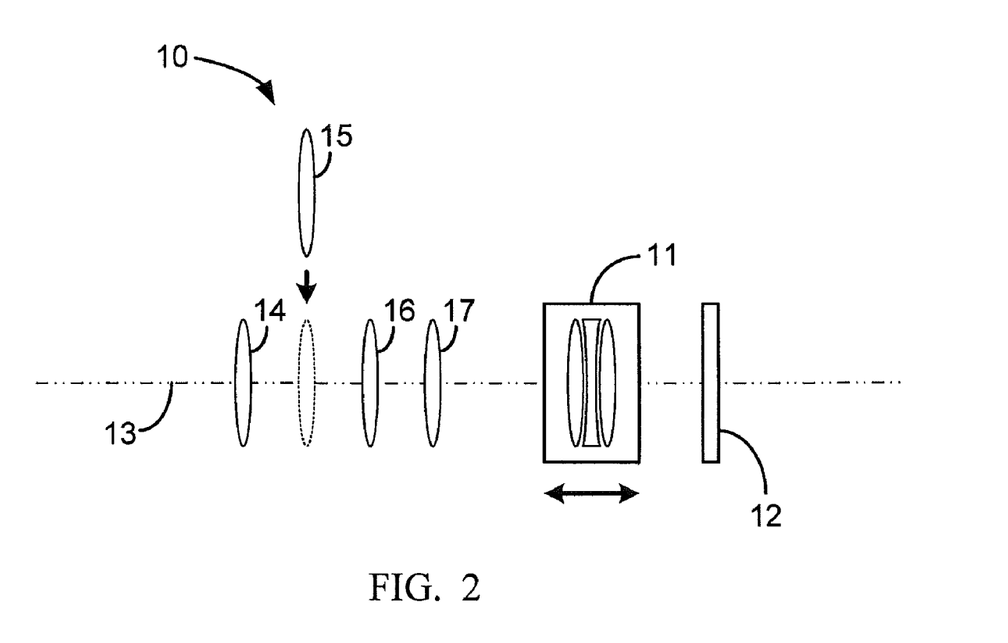
FIG. 2 is a semi-schematic side view of the camera having a zoom lens assembly of FIG. 1, wherein the first, third, and fourth lenses are positioned in the optical path of the zoom lens assembly and the second lens is not positioned in the optical path of the zoom lens assembly.

Referring now to FIG. 2, one example of a combination of lenses 14-17 that can be moved from a position out of optical path 13 to a position in optical path 13 is shown. According to this example, first lens 14, third lens 16, and fourth lens 17 have been moved into optical path 13. In this manner, a plurality of different combinations of lenses can be moved into optical path 13 so as to provide a corresponding plurality of different magnifications and/or other qualities of an image upon imaging sensor 12.

It is important to appreciate that FIG. 2 is just one example of a combination of lenses 14-17 that can be moved from a position out of optical path 13 to a position in optical path 13. For example, any single lens 14-17 could be so moved, any pair of lenses 14-17 could be so moved, any three lenses 14-17 could be so moved, and all of lenses 14-17 could be so moved.

Lenses 14-17 can all have substantially identical powers and other qualities (such as aberration correction). In this instance, moving a single lens 14-17 out of optical path 13 and then moving another single lens 14-17 into optical path 13 is somewhat equivalent to moving a lens along optical path 13 by the distance separating the two lenses. For example, moving first lens 14 out of optical path 13 (after it has first been moved thereinto) and then moving second lens 15 into optical path 13 is somewhat equivalent to moving a single lens having the same power and aberration corrections as first lens 14 from the position of first lens 14 in optical path 13 to the position of second lens 15 in optical path 13. Thus, we have the ability to effectively move a lens. That is, the effect of such swapping of lenses 14 and 15 is similar to the effect of moving lens 14.

Moving two lenses 14-17 into the optical path 13 changes the total magnification power as compared to moving a single lens 14-17 into the optical path. Adding a lens can either increase or decrease the total magnification. Similarly, removing a lens can either increase or decrease the total magnification.

Additionally, we have the ability to change the lens (such as to effectively change the power or other quality thereof), either as we move the lens or as we leave it stationary. Thus, swapping of two lenses can change qualities of the lens such as magnification and/or aberration correction, either with or without effectively changing the position thereof.

Effectively moving a lens, such as by moving a lens 14-17 out of the optical path and subsequently moving a different, but substantially identical lens 14-17, into the optical path, can change the magnification. Thus, the effect of a contemporary zoom lens (wherein one or more lenses move along the optical path) can be simulated.

Lenses 14-17 can have different powers with respect to one another. In this instance, replacing any one lens with another lens is not merely equivalent to moving the first lens. Replacing one lens with another can instead be equivalent to removing one lens and replacing it with a different lens at a different position.

The power of lenses 14-17 can all be the same or can differ in any desire manner. Thus, the power of lenses 14-17 can increase by a fractional amount, such as by 10%, from one lens to the next. Alternatively, the power of lenses 14-17 can double, or increase by a decade, from front to back, from back to front, or in any other desired manner.

Since any desired one of lenses 14-17 or any desired combination of lenses 14-17 can be moved into optical path 13, a wide range of magnifications or other parameters can be provided. This is particularly true if the power of each of lenses 14-17 differs. The more that the power or other attribute of each of lenses 14-17 differs with respect to one another, the wider the range can be.

One or more of lenses 14-17 can be configured for close focusing. For example, one or more of lenses 14-17 can define a macro configuration, such as for focusing a few centimeters from first lens 14.

The discussion and showing of four lenses 14-17 of zoom lens assembly 10 is by way of illustration only and not by way of limitation. Any desired number of such lenses can be used. This, zoom lens assembly 10 can be configured so as to move one, two, three, four, five, six, or more lenses into and out of optical path 13 of the camera.

Figure 3:
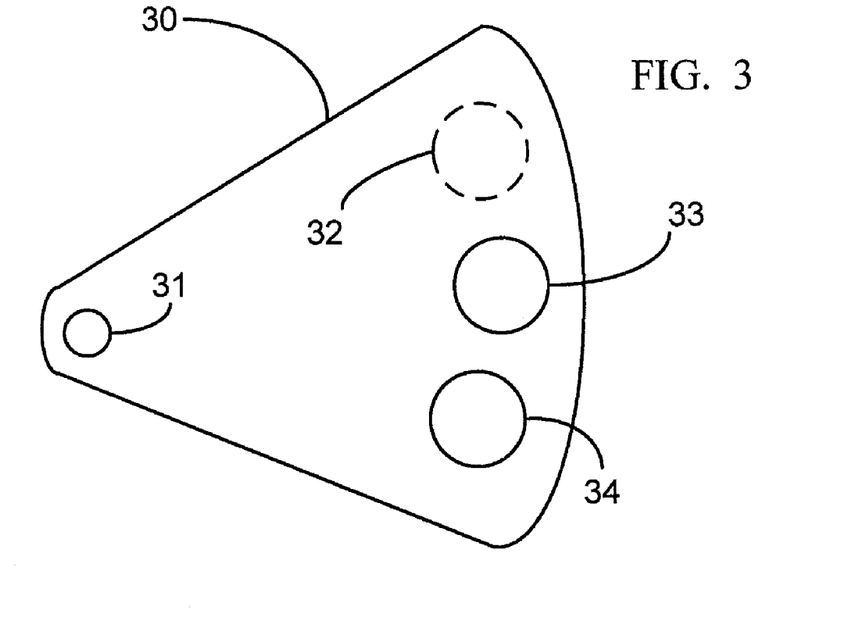
FIG. 3 is a semi-schematic front view of a shutter blade having a zoom lens according to an exemplary embodiment of the present invention.

Referring now to FIG. 3, a shutter blade 30 can be configured to place a zoom lens, macro lens, or other lens in the optical path of a camera. Thus, shutter blade 30 can comprise a solid or light blocking portion 32 which obscures the optical path until an exposure is desired. Shutter blade 30 can comprise an opening 33 that facilitates an exposure when placed in the optical path. Opening 33 can have no lens at all, or can contain a lens that has no magnification (but can optionally provide aberration correction). Alternatively, shutter blade 30 can be configured to move so as to be entirely out of the optical path when an exposure is desired. Further, shutter blade 30 can place lens 34 in the optical path when an exposure is desired. Thus, shutter blade 30 can have three positions, i.e., a first position that blocks light, a second position that can let light enter without magnification, and a third position that provides magnification or zoom. A pivot 31 facilitates movement of shutter 30 according to well known principles.

Figure 4:
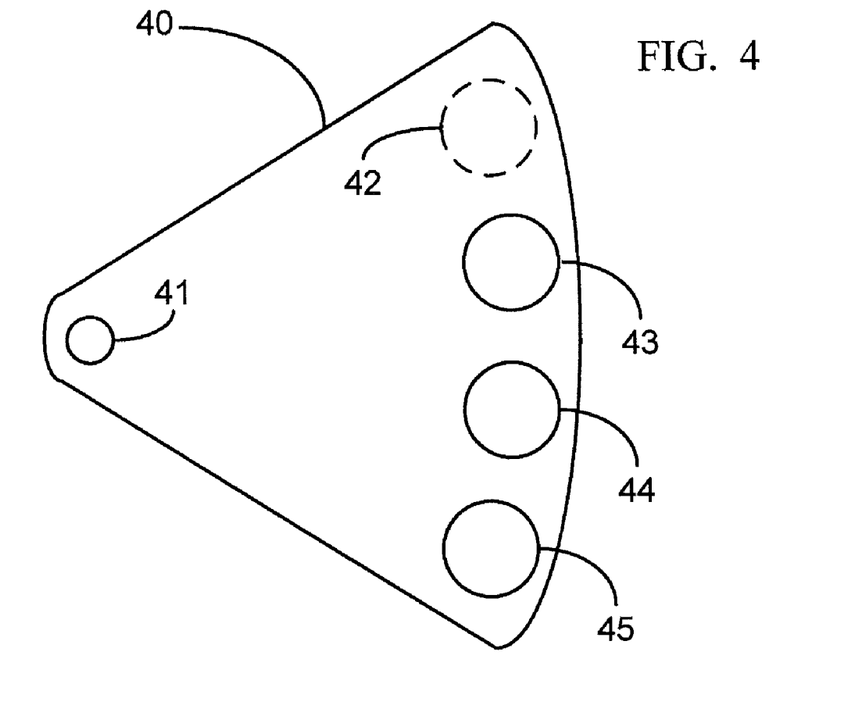
FIG. 4 is a semi-schematic front view of a shutter blade having a plurality of zoom lenses according to an exemplary embodiment of the present invention.

Referring now to FIG. 4, a shutter blade 40 can comprise a plurality of lenses 44 and 45. Lenses 44 and 45 can be different with respect to one another, so as to provide different amounts of magnification or different aberration corrections, for example. One or more of lenses 43 and 45 can be a macro lens. Opening 43 can contain no lens at all, or a lens with no magnification. A pivot 41 facilitates movement of shutter 40 according to well known principles. Thus, shutter blade 40 can have four or more positions, i.e., a first position that blocks light, a second position that can let light enter without magnification, and at least two additional positions that provide magnification and/or aberration correction.

Figure 7:
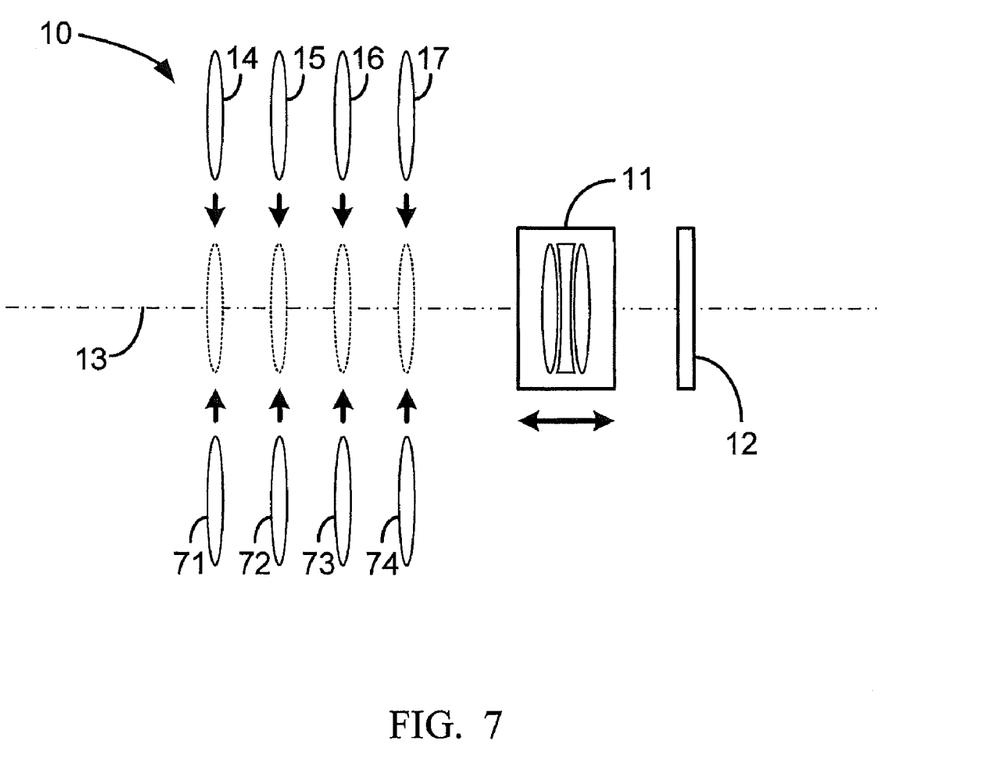
FIG. 7 is a semi-schematic side view of a camera having a zoom lens assembly according to an exemplary embodiment of the present invention, wherein a plurality (in this instance, two) of lenses are configured to move in and out of each position along the optical path of the zoom lens assembly and all of the lenses are shown positioned out of the optical path.

Shutter blades 30, 40 of FIGS. 3 and 4 can be used either with or without a zoom lens assembly as shown in FIG. 1. Indeed, shutter blades like those of FIGS. 3 and 4 can be used to move lenses into and out of optical path 13 according to the embodiment shown in FIG. 1. In this manner, more than one lens is available to move into the optical path 13 at the positions of each of lenses 14-17. An example of a zoom lens assembly where more than one lens can move into each position of the optical path is shown in FIG. 7 and a shutter blade such as that of FIG. 3 or FIG. 4 can be used to effect such operation.

Optical elements other than lenses can be used in the shutter blades of FIGS. 3 and 4. For example, spectral filters, polarizing filters, or any other optical elements can be used. Each position of the shutter blade can have more than one optical element, such as a lens and a filter. Thus, each position of the shutter blade can have any desired combination of optical elements.

Figure 5:
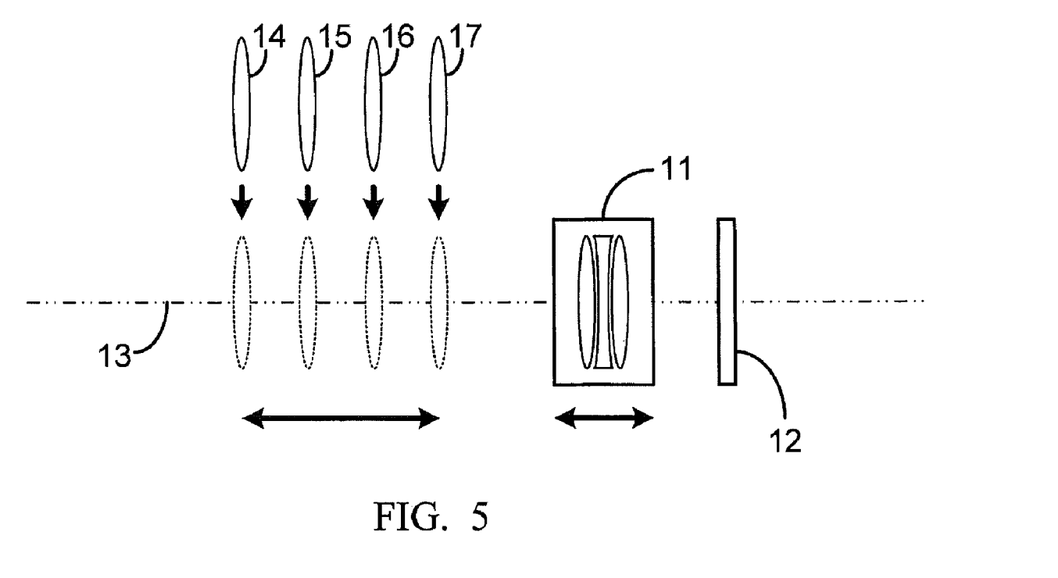
FIG. 5 is a semi-schematic side view of a camera having a zoom lens assembly according to an exemplary embodiment of the present invention, wherein all of the lenses are configured to move in and out of the optical path of the zoom lens assembly and at least one of the lenses is also configured to move along the optical path and wherein all of the lenses are shown out of the optical path.

Referring now to FIG. 5, lenses 14-17 of the zoom lens assembly can be configured so as to move along optical path 13. In this manner, any of lenses 14-17 that are in optical path 13 can be moved along optical path 13 so as to fine tune the magnification provided thereby. Thus, if one of the discrete magnifications, for example, provided by a particular combination of lenses 14-17 being in optical path 13 is not a desired magnification, then all of lenses 14-17 that are in optical path 13 can be moved either toward or away from imaging sensor 12 so as to provide the desired magnification.

Figure 6:
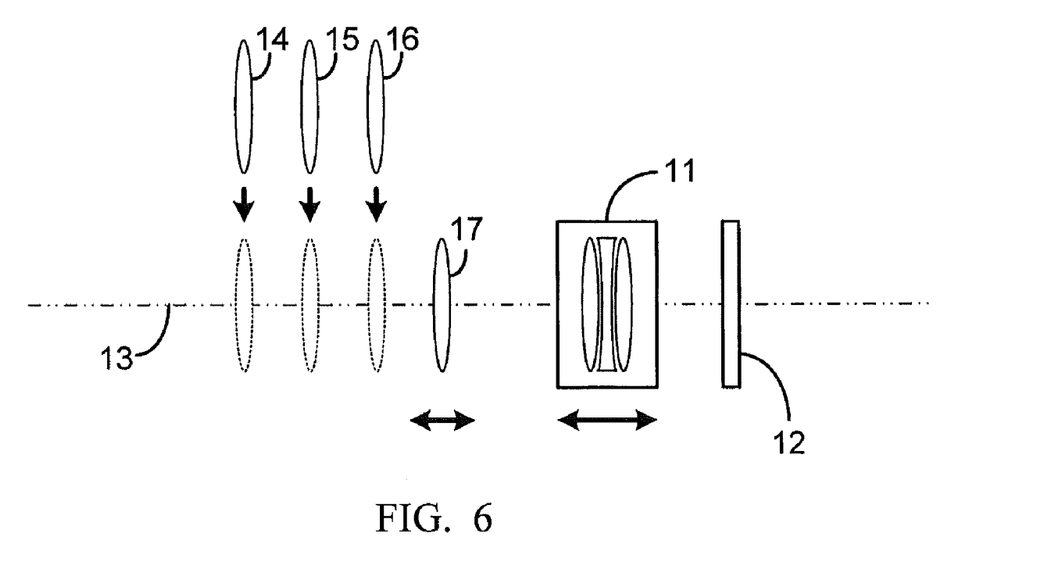
FIG. 6 is a semi-schematic side view of a camera having a zoom lens assembly according to an exemplary embodiment of the present invention, wherein all but one of the lenses are configured to move in and out of the optical path of the zoom lens assembly and only the lens that is not configured to move in and out of the optical path is configured to move along the optical path.

Referring now to FIG. 6, only lens 17 is movable along optical path 13. Lens 17 can be permanently in optical path 13. Thus, lens 17 can be dedicated to movement along optical path 13, while lenses 14-16 are dedicated to movement in and out of optical path 13.

Any desired number of lenses can be configured so as to move in any desired fashion, according to the present invention. Thus, any of lenses 14-17 can be configured to move in and out of optical path 13 and any of lenses 14-17 can be configured to move along optical path 13. By moving lenses 14-17 into or out of optical path 13, larger changes in magnification can be obtained. By moving any of lenses 14-17 that are in optical path 13 along optical path 13, smaller changes in magnification can be obtained.

The amount of movement of lenses 14-17 along optical path 13 can be much smaller that the movement of the lenses of a contemporary zoom lens assembly along the optical path thereof. Thus, the size of a zoom lens assembly that is configured for such movement along optical axis 13 can be substantially smaller that a contemporary zoom lens assembly.

Referring now to FIG. 7, a plurality of lenses can be configured to move into each position along the light path of the zoom lens assembly 10. That is, rather than only being able to move a single lens 14-17 into a given position (as is the case for the zoom lens assemblies of FIGS. 1, 2, 5, and 6), any one of a plurality of lenses can be moved into a given position. More particularly, as shown in FIG. 7, either of two lenses can be moved into each position along the light path of zoom lens assembly 10. Thus, more flexibility in the possible magnification and/or aberration corrections is possible.

For example, either lens 14 or lens 71 can be moved into the leftmost or first position, either lens 15 or lens 72 can be moved into the second position, either lens 16 or lens 73 can be moved into the third position, and either lens 17 or lens 74 can be moved into the last or fourth position. Of course, no lens at all needs to be moved into any position, if desired. Thus, any given position can have no lens or a lens selected from the plurality of lenses that can move into that position.

Moving lenses in and out of the optical path of the camera can be done so as to simulate or achieve the effect of lens movement (so as to vary magnification, for example). It can also be done so as to change some aspect of the lens, such as the aberration correction that the lens provides, without achieving the effect of lens movement. It can also be done so as to both achieve the effect of lens movement and to change some aspect of the lens. Thus, such swapping of lenses can be done so as to change lenses or so as to effectively move lenses. When one lenses is swapped for another, the other lens can be identical, can have one or more different surface curvatures, can have different elements or a different number of elements, and/or can have one or more elements with different indices of refractions.

Lenses 14-17 and 71-74 can be moved in and out of the optical path by any suitable method or device. For example, lenses 14-17 and 71-74 can be moved in and out of the optical by using an actuator or motor, such as a Lorentz actuator. Micro electromechanical systems (MEMS) can be used to move lenses 14-17 and 71-74 in and out of the optical path.

Figure 8:
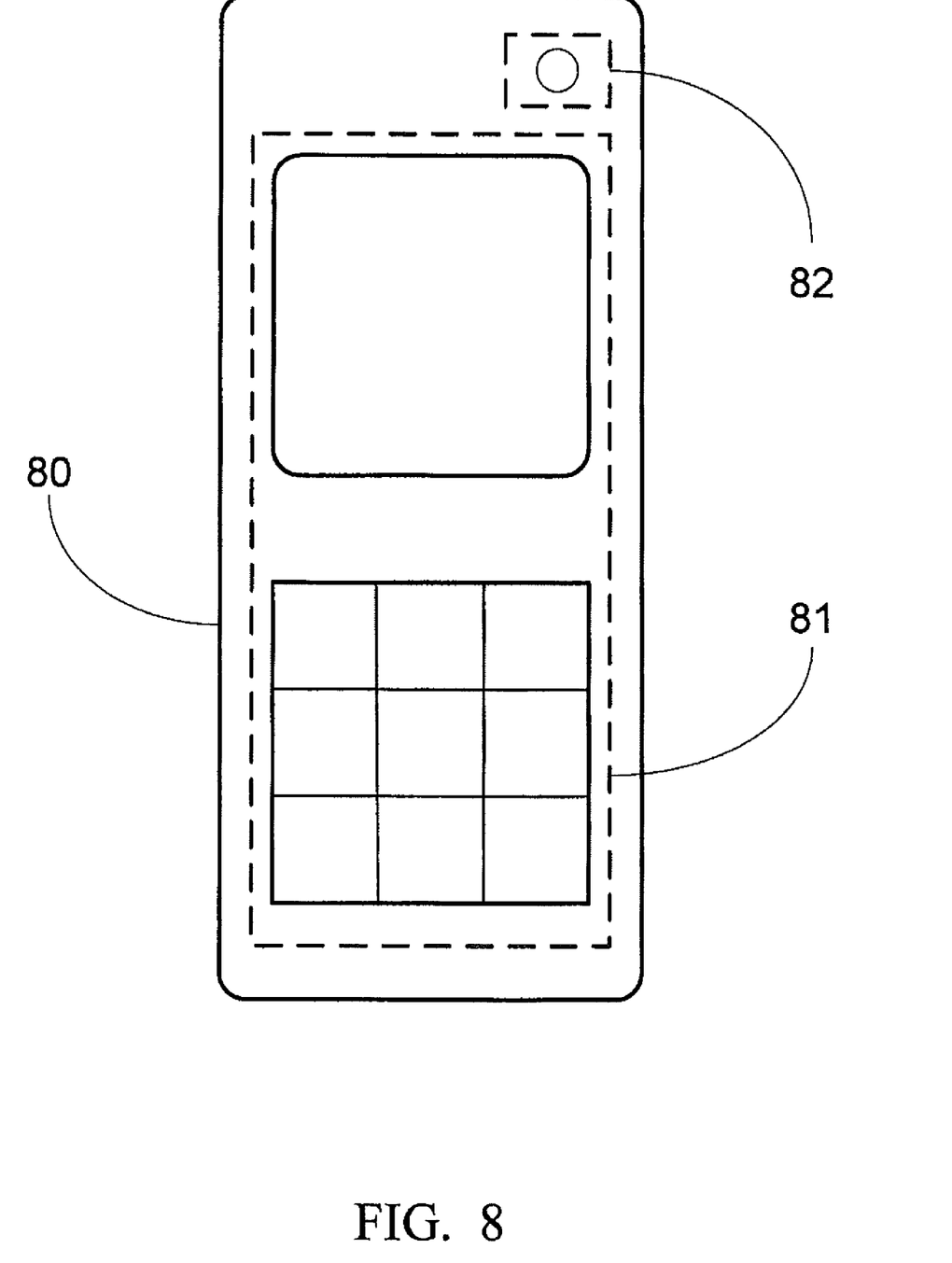
FIG. 8 is a front view of a cellular telephone having a zoom camera, according to an embodiment of the present invention.

Referring now to FIG. 8, a cellular telephone 80 comprises a cellular transceiver 81 and a camera 82. Camera 82 can comprise a zoom lens assembly according to one or more embodiments of the present invention. For example, camera 82 can comprise the zoom lens assembly of FIG. 1, FIG. 5, FIG. 6, or FIG. 7 and/or the shutter blade of FIG. 3 or FIG. 4.

Although discussed herein as being suitable for use in miniature cameras, one or more aspects of the present invention may be similarly suitable for use in non-miniature cameras.

Lenses are described herein as the optical elements that are moved in and out of the optical path so as to achieve desired optical effects, e.g., magnification or zoom. However, other types of optical elements may similarly be moved in and out of the optical path to achieve a variety of different desired optical effects. For example, spectral filters, polarizing filters, diffraction gratings, or any other desired optical elements may be moved in and out of the optical path according to the present invention. Thus, discussion of lenses herein is by way of example only and not by way of limitation.

Further, although one or more embodiments of the present invention are discussed as being either zoom lens assemblies or for use in zoom lens assemblies, those skilled in the art will appreciate that applications of the present invention need not be limited to zoom lens assemblies or use therein. For example, lenses can be moved in and out of an optical path to effect focusing, zoom, the use of filters, or for any other desired reason.

By eliminating or mitigating movement of zoom lens elements along the optical axis of a camera, the length of the camera can be substantially reduced. Thus, a camera having zoom capabilities that is suitable for use in personal electronic devices such as cellular telephones can be made.

Embodiments described above illustrate, but do not limit, the invention. It should also be understood that numerous modifications and variations are possible in accordance with the principles of the present invention. Accordingly, the scope of the invention is defined only by the following claims.

The invention claimed is:

1. A shutter blade for a camera, the shutter blade comprising:
   a light blocking portion of the shutter blade that is configured to block light from entering the camera when the shutter blade is disposed in a first position;
   an opening in the shutter blade that is configured to enable light to enter the camera without modification of the light when the shutter blade is disposed in a second position; and,
   at least one lens attached to the shutter blade that is configured to magnify an image when the shutter blade is disposed in a third position.

2. A zoom lens/shutter assembly for a camera, the zoom lens/shutter assembly comprising:
   a shutter blade;
   a light blocking portion of the shutter blade that is configured to block light from entering the camera when the shutter blade is disposed in a first position;
   an opening in the shutter blade that is configured to enable light to enter the camera without modification of the light when the shutter blade is disposed in a second position; and,
   at least one lens attached to the shutter blade, the lens being configured to magnify an image of the camera when the shutter blade is disposed in a third position.

3. The zoom lens/shutter assembly as recited in claim 2, wherein the at least one lens comprises a plurality of lenses that are configured to magnify an image of the camera when the shutter blade is disposed in a corresponding one of a plurality of positions, each lens being configured to magnify the image by a different amount and each lens being individually selectable for placement into a light path of the camera.

4. A method for zooming a camera, the method comprising:
   providing the camera with the zoom lens/shutter assembly of claim 2; and
   moving the at least one lens into an optical path of the camera.

5. The method as recited in claim 4, wherein moving the at least one lens into an optical path of the camera comprises moving the shutter blade having the at least one lens attached thereto into the third position.

* * * * *

UNITED STATES PATENT AND TRADEMARK OFFICE
CERTIFICATE OF CORRECTION

PATENT NO. : 7,747,155 B1  Page 1 of 1
APPLICATION NO. : 12/353728
DATED : June 29, 2010
INVENTOR(S) : Roman C. Gutierrez It is certified that error appears in the above-identified patent and that said Letters Patent is hereby corrected as shown below:

In the Specification:

In column 2, line 19, after "can" insert --be--.

In column 3, line 63, change "instanced" to --instance--.

In column 6, line 43, change "that" to --than--.

In column 7, line 4, change "lenses" to --lens--.

Signed and Sealed this

Fourteenth Day of September, 2010

David J. Kappos
*Director of the United States Patent and Trademark Office*